United States Patent [19]
Rishel

[11] Patent Number: 5,448,022
[45] Date of Patent: Sep. 5, 1995

[54] TIP-ON WHEELCHAIR SCALE ADAPTOR

[76] Inventor: Richard C. Rishel, 414 Defiance Ave., Findlay, Ohio 45840

[21] Appl. No.: 372,560

[22] Filed: Jan. 13, 1995

[51] Int. Cl.6 ............... G01G 21/00; G01G 19/00; G01G 21/22
[52] U.S. Cl. .................... 177/126; 177/145; 177/262; 177/263
[58] Field of Search ............... 177/262, 263, 126, 145

[56] References Cited

U.S. PATENT DOCUMENTS

| | | | |
|---|---|---|---|
| 3,191,701 | 6/1965 | Gray | 177/161 |
| 3,630,299 | 12/1971 | Albagli | 177/126 |
| 3,732,938 | 5/1973 | Nelson | 177/126 |
| 3,961,675 | 6/1976 | Siegel | 177/126 |
| 4,013,135 | 3/1977 | Kechely | 177/144 |
| 4,033,420 | 7/1977 | De Masters | 177/126 |
| 4,043,413 | 8/1977 | Schuenen | 177/126 |
| 4,126,197 | 11/1978 | Kechely | 177/145 |
| 4,441,568 | 4/1984 | Heffner | 177/262 X |
| 4,979,580 | 12/1990 | Lockery | 177/211 |
| 5,086,856 | 2/1992 | Haggstrom | 177/161 |

Primary Examiner—Peter S. Wong
Assistant Examiner—Randy W. Gibson
Attorney, Agent, or Firm—Marshall & Melhorn

[57] ABSTRACT

An adapting frame for a scale for weighing an individual in a wheelchair. The adapting frame permits the weighing of an individual in a wheelchair by allowing the chassis of the wheelchair to rest entirely upon the frame. The occupied wheelchair is positioned onto the frame through a series of steps in which the wheelchair first engages the frame and is then pivoted entirely onto the adapting frame about the wheelchair chassis. The frame evenly distributes the weight across the scale to obtain an accurate reading.

10 Claims, 3 Drawing Sheets

TIP-ON WHEELCHAIR SCALE ADAPTOR

BACKGROUND OF THE INVENTION

1. Field of the Invention

This invention relates to an adapting apparatus for a scale and more particularly to an adapting frame connected to a scale which allows the weighing of an individual in a wheelchair. The adapting frame assists in weighing the individual by supporting the chassis of the wheelchair upon the scale in order to obtain an accurate scale reading.

2. Summary of Related Art

It is important to obtain weight measurements when monitoring the health and well being of an individual restricted to a wheelchair. Hospitals and nursing homes utilize sophisticated and expensive equipment in weighing patients restricted to wheelchairs. These systems are not practical for use in homes, doctor's offices, clinics, or smaller nursing homes.

Many of the present systems require the lifting or shifting of the individual. Weighing an individual in this manner can be a difficult task particularly when it becomes painful for the individual to move in or out of the wheelchair. This method generally requires several people to assist in the weighing process. Additional assistance is not always readily available in the home or the doctor's office.

The size and structure of a wheelchair makes it difficult to weigh the individual in the home, clinic, or doctor's office while the individual remains in the wheelchair. The presently available equipment for weighing an individual in a wheelchair generally requires a large area or space to set up the apparatus. This creates a problem in confined areas where space is at a premium. Furthermore, the equipment is not easily stored after use.

Therefore, it is desirable to have a means to weigh an individual in a wheel chair in the home or doctor's office with a device that is easily accessible and is readily stored after use. The device must provide some degree of accuracy in weighing the individual. It should also be operable with the aid of a single attendant. More importantly, it should minimize any discomfort to the individual in the wheelchair.

Scale adapters are known in the prior art. Most of these devices are configured to allow the wheelchair to roll up and onto a weighing scale via a ramp. These systems generally cover a large area and are difficult to store in the home or other space limited areas.

U.S. Pat. No. 3,630,299 to Albagli discloses an adapting platform form for a balance beam type scale. The platform utilizes parallel tracks with ramps to provide access to the scale. The wheelchair then rests in the tracks in order to obtain a weight measurement.

U.S. Pat. No. 3,732,938 to Nelson discloses a plurality of support beams which form a base for mounting the platform onto the scale. The support beams are adjustable in order to accommodate scales of various sizes. Two parallel tracks are arranged along the longitudinal axis of the scale and are connected to the support beams. The wheelchair is then positioned upon the tracks to obtain a weight measurement.

U.S. Pat. No. 4,126,197 to Kechely discloses an adapting platform for a weighing scale. The platform has parallel tracks which allow the wheelchair to rest entirely upon the apparatus. A reading is then obtained while the wheelchair and platform are positioned over a scale.

The prior art inventions generally disclose a platform which is large enough and wide enough to support a wheelchair at all four wheels. The prior art platforms fit over a conventional scale in order to obtain a weight reading. The wide bases associated with these devices can cause inaccurate readings if the individual shifts while on the scale. This shifting or moving can cause the center of gravity to shift as well. With the wide base, the center of gravity may shift to a location which is not directly over the scale which results in inaccurate readings.

It would be advantageous to accurately weigh an individual in a wheelchair on a portable scale without additional assistance and without any pain or discomfort to the individual in the wheelchair. Furthermore it would be a benefit to have a weighing apparatus that occupies a relatively small area and is easily stored.

SUMMARY OF THE INVENTION

In accordance with the present invention, there is provided an adapting frame for a scale for weighing an individual in a wheelchair. The adapting frame permits the weighing of an individual in a wheelchair by allowing the chassis of the chair to rest entirely upon the frame. The frame evenly distributes the weight across the scale to obtain an accurate reading. Furthermore, the adapting frame is manufactured with low cost materials of construction and requires a small area for storage when not in use.

The adapting frame has a base for securely engaging the upper surface of a scale. The base also has a viewing notch which permits observation of the weight indicator on the scale. The base has longitudinal edges from which a bracket extends downward to engage the sides of the scale in order to prevent movement of the base of the frame on the scale.

A support member extends upward from the base. The support member provides a support for the top sheet of the frame. The support member and the top sheet are sized according to the specific width and ground clearance of the wheelchair. The top sheet is also sized according to the dimensions of the wheelchair chassis.

The planar sheet has a lateral edge that pivotably engages the wheelchair chassis when the wheelchair is tilted back at an acute angle from the horizontal position. The wheelchair is then tilted forward about the lateral edge so that the chassis then rests entirely upon the top sheet. The wheelchair is lifted off the ground when it is tilted forward back into the horizontal position. The wheelchair and its occupant are now resting entirely on the frame and the weight of the individual may now be obtained by noting the weight shown on the scale and deducting the weight of the empty wheelchair.

The objective of the present invention is to provide a convenient means of weighing an individual in a wheelchair. The present invention eliminates the necessity of transferring the individual from the wheelchair into a weighing apparatus. The invention accomplishes the task of weighing the individual in the wheelchair with the use of only a single assistant.

A further objective of the present invention is to provide a light weight, lost cost, and portable apparatus which can fit onto any conventional weighing scale.

The apparatus is small enough so that it may be conveniently stored out of the way until needed.

Another objective is providing an apparatus which yields accurate weight readings because the center of gravity of the apparatus is centrally located. Accurate reading are obtained because the load is evenly distributed over the scale. Additionally, the wheels are lifted off the ground which reduces the tendency to drift from position.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
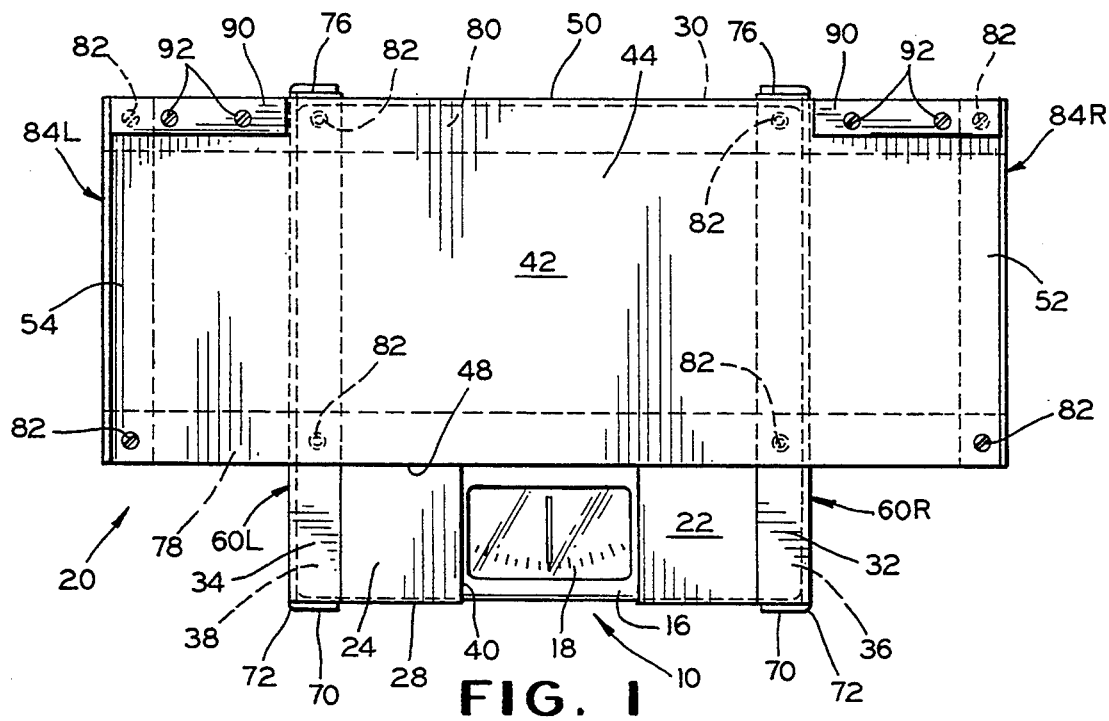
FIG. 1 is a top plan view of the adapting frame as it rests upon the scale.
Figure 2:
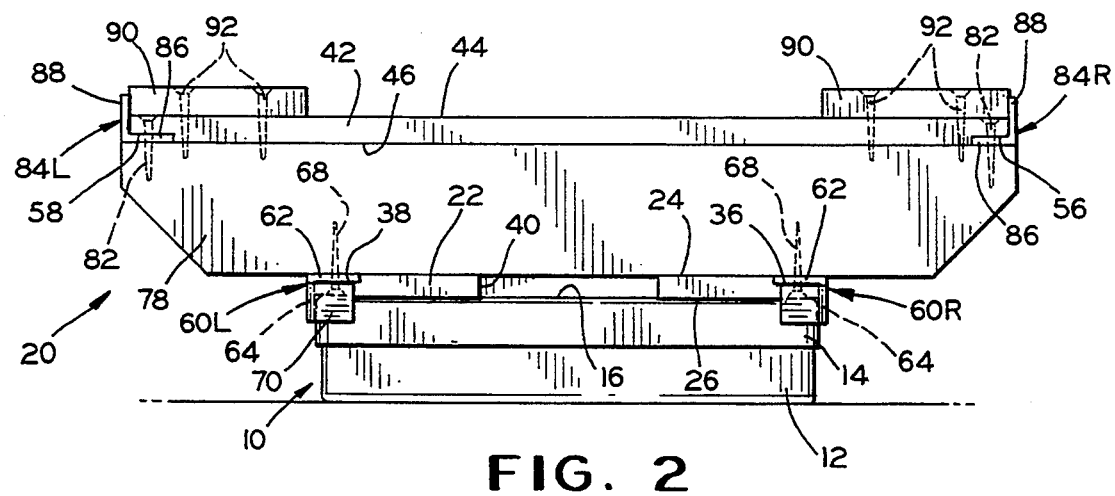
FIG. 2 is a front elevational view of the adapting frame as it rests upon the scale.
Figure 3:
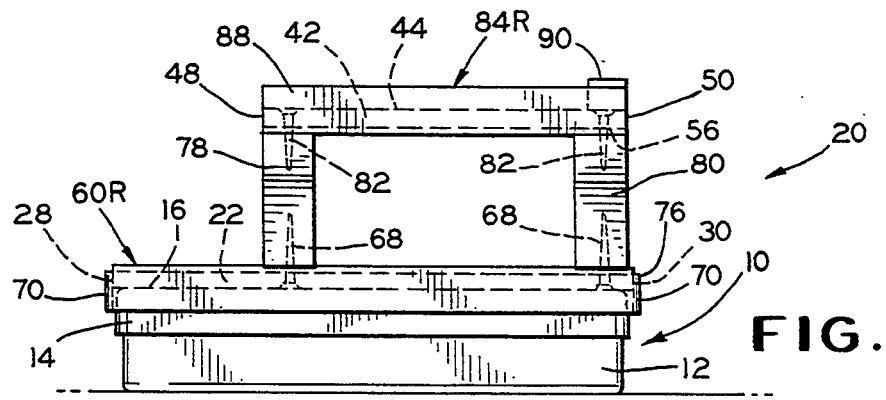
FIG. 3 is a side elevational view of the adapting frame as it rests upon the scale.
Figure 4:
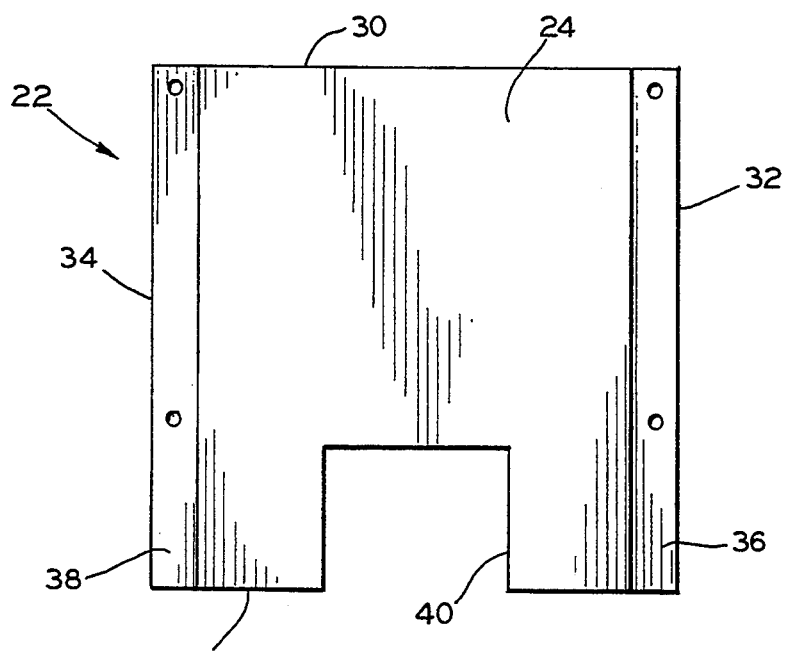
FIG. 4 is a top plan view of the base of the adapting frame of the present invention.
Figure 5:
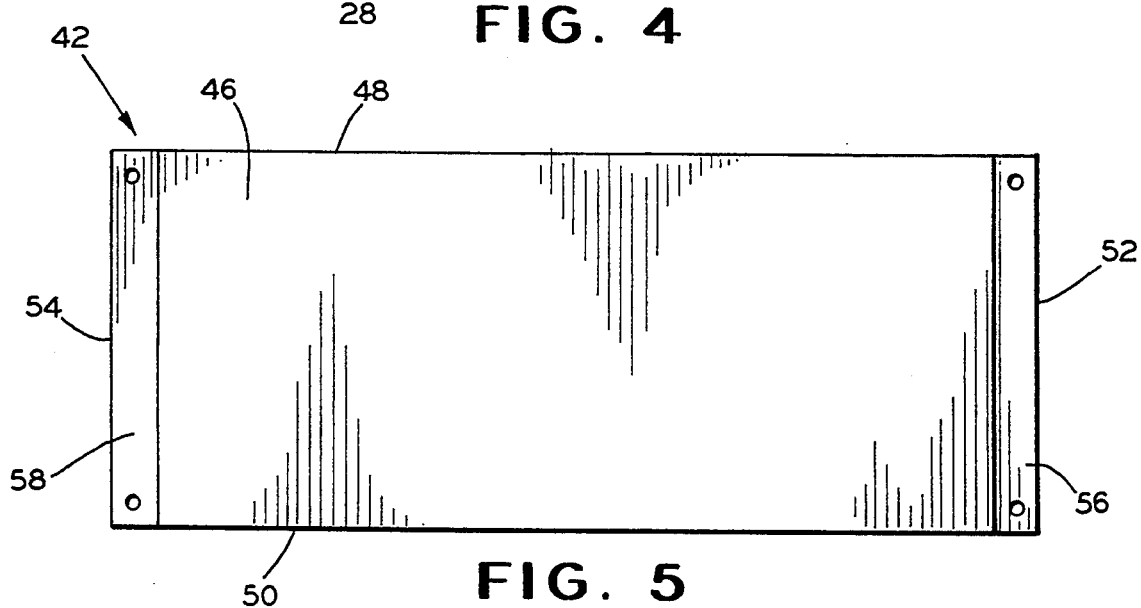
FIG. 5 is a bottom plan view of the top sheet of the adapting frame.
Figure 6:
FIG. 6 is a top plan view of a bottom bracket for the adapting frame.
Figure 7:
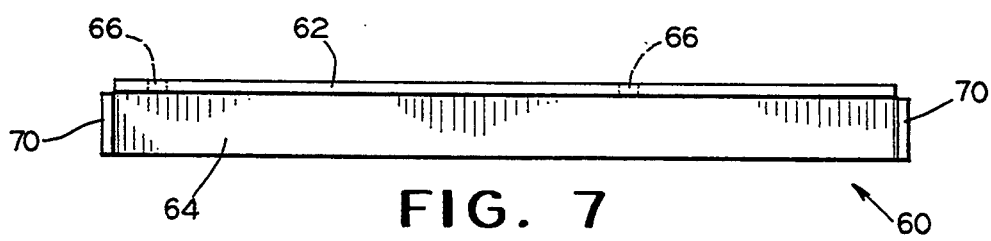
FIG. 7 is a side elevational view of the bottom bracket shown in FIG. 6.

Referring now more particularly to the drawings, there is illustrated in FIGS. 1–7 a scale 10 having a scale base 12, scale platform 14 and weight indicator 18. The adapting frame 20 of the present invention is positioned upon the upper surface 16 of the scale platform to facilitate weighing of an individual occupying a wheelchair.

The adapting frame 20 includes a planar base 22 having an upper surface 24, a lower surface 26, lateral edges 28, 30, and longitudinal edges 32, 34 with recessed upper surfaces 36, 38. A viewing notch 40 is formed in lateral edge 28 of the base 22. When the adapting frame 20 is positioned on the scale 10, the viewing notch 40 permits observation of the weight indicator 18.

The top sheet 42 provides a planar surface of the adapting frame 20 for supporting the wheelchair. The top sheet 42 includes an upper surface 44, a lower surface 46, lateral edges 48, 50, and longitudinal edges 52, 54 with recessed lower surfaces 56, 58.

A pair of elongate bottom brackets 60L, 60R are secured to the base 22 in parallel, spaced-apart relationship along longitudinal edges 32, 34. The bottom brackets 60L, 60R are right-angle brackets having a horizontal segment 62 and vertical segment 64. The horizontal segment 62 of the brackets 60L, 60R are mounted in the recessed upper surfaces 36, 38 of the base 22. The vertical segment 64 of the brackets 60L, 60R extend past the longitudinal edges 32, 34 to provide a surface for engaging the side edges of the scale platform 14. The brackets 60L, 60R prevent the adapting frame 20 from sliding in a lateral direction when mounted on the scale 10. The brackets 60L, 60R may be formed from aluminum, plastic, or other suitable material.

The brackets have a pair of adjustment slots 66 formed in the horizontal segment 62. The spacing between the left bracket 60L and the right bracket 60R can be adjusted after assembly by loosening mounting screws 68 and sliding the brackets 60L, 60R to provide the desired fit about the scale platform.

The end 70 of the brackets 60L, 60R at lateral edge 28 is closed to form a corner 72 to engage the corner of the scale platform 14. For an aluminum bracket, the corner 72 may be formed by bending an extended horizontal segment 74 perpendicular to the balance of the horizontal segment 62. The opposite end 76 of the brackets 60L, 60R may either be open or closed.

Mounting screws 68 extend through the base 22 and the brackets 60L, 60R to secure lateral support members 78, 80 which extend vertically from the base 22. Each support member 78, 80 has two mounting apertures in the bottom edge which are aligned with corresponding apertures in the base 22. The mounting screws, when tightened, are fully recessed in the lower surface 26 of the base 22.

Support members are required to position and support the top sheet 42 at the desired height and desired width for weighing the wheel chair. The height and length of the lateral support members 78, 80 are sized to accommodate and support a wheelchair, as hereinafter described. Other support member configurations and/or shapes could be used to provide the necessary support to the top sheet 42.

Since wheel chairs come in only a few different chassis heights and widths, the overall height and width of the adapting frame 20 could be standardized in two or three model sizes to accommodate a majority of wheel chairs. From a manufacturing standpoint, the size of the adapting frame 20 of the present invention could easily be changed by simply providing alternative support members 78, 80 and top sheet 42 with the desired height and width.

The top sheet 42 is mounted on the top edges of the lateral support members 78, 80. Each support member 78, 80 has two mounting apertures in the top edge which are aligned with corresponding apertures in the top sheet 42. Mounting screws 82, when tightened, are fully recessed in the upper surface 44 of the top sheet 42.

Top brackets 84L, 84R are secured between the top sheet 42 and the support members 78, 80. The top brackets 84L, 84R are right-angle brackets having a horizontal segment 86 and vertical segment 88. The horizontal segment 86 of the brackets 84L, 84R are mounted in the recessed lower surfaces 56, 58 of the top sheet 42. The vertical segment 88 of the top brackets 84L, 84R extend upward past the longitudinal edges 52, 54 of the top sheet 42 to form side rails which prevent the chassis of the wheelchair from slipping off of the side of the adapting frame 20. The top brackets 84L, 84R may be formed from aluminum, plastic, or other suitable material.

Tilt rails 90 are mounted on the upper surface 44 of the top sheet 42 along lateral edge 50. The tilt rails 90 are secured by mounting screws 92 which are driven through the top sheet 42 into the top edge of the lateral support member 80. The height of the tilt rails 90 is sufficient to maintain the wheelchair at the desired angle when positioned on the top sheet 42.

Hardwood is the preferred materials for the base 22, top sheet 42, support members 78, 80 and tilt rails 90. Other materials of construction are acceptable so long as such materials provide the requisite support and weight transfer when used in the adapting frame 20.

Having set forth a description of the structure of the present invention, the use and function of the adapting frame 20 may now be described with particular reference to FIGS. 8–12. The frame 20 must be securely positioned on the scale 10 to prevent the frame 20 from sliding off of the scale 10 and to effectively transfer the weight of the wheelchair 94 from the adapting frame 20 to the scale platform 14.

The initial step in positioning the adapting frame 20 is to adjust the spacing of the bottom brackets 60L, 60R such that the brackets 60L, 60R are adjacent and/or engaging the side edges of the scale platform 14 to prevent lateral movement of the frame 20 without impairing the weighing action of the scale platform 14.

After the bottom brackets 60L, 60R are adjusted, the frame 20 is place on the scale 10 such that the corners 72 of the bottom brackets 60L, 60R are adjacent and/or engaging the corners of the scale platform 14. The segments 74 of the bottom brackets 60L, 60R prevent movement of the frame 20 in a longitudinal direction. The viewing notch 40 in lateral edge 28 is automatically positioned over the weight indicator 16.

Figure 8:
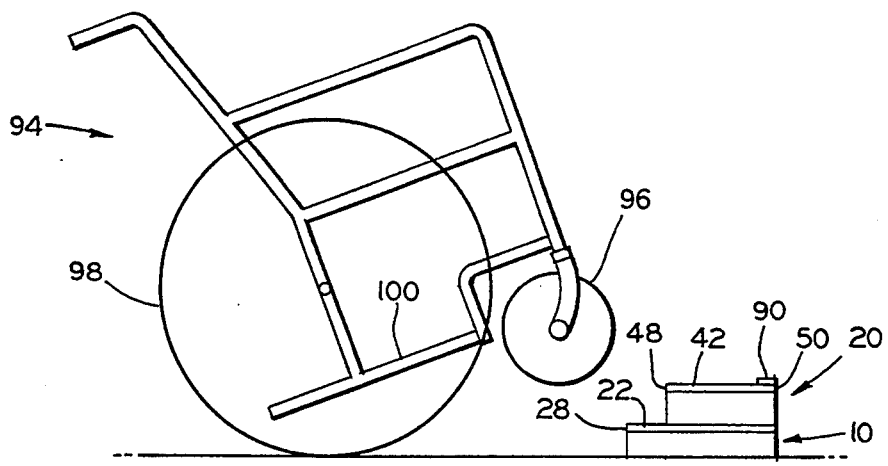
FIG. 8 is a side elevational view of a wheelchair tilted backwards at an acute angle from the horizontal position as it approaches the adapting frame and scale.
Figure 9:
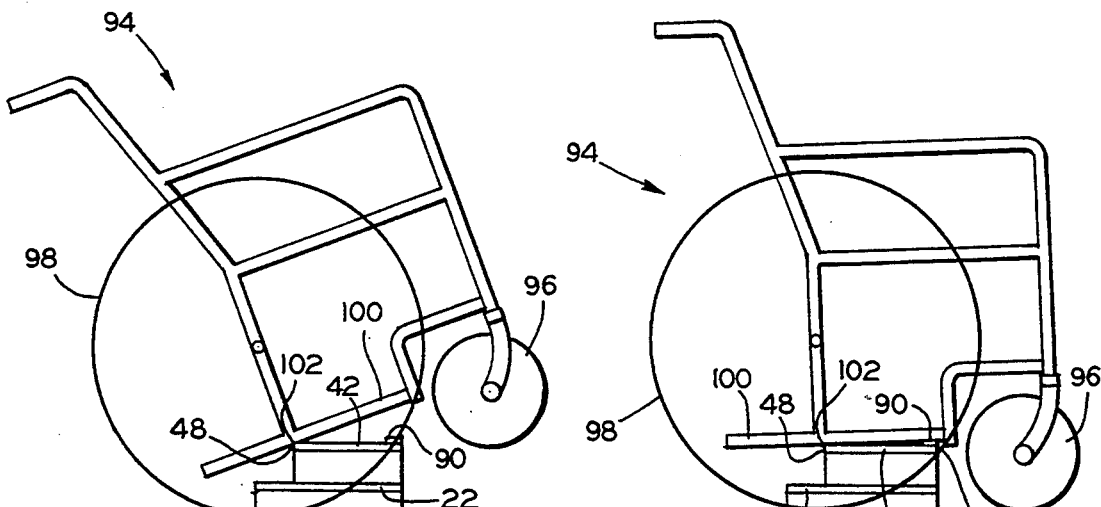
FIG. 9 is a side elevational view of the wheelchair chassis engaging the pivot edge of the top planar piece of the adapting frame.
Figure 10:
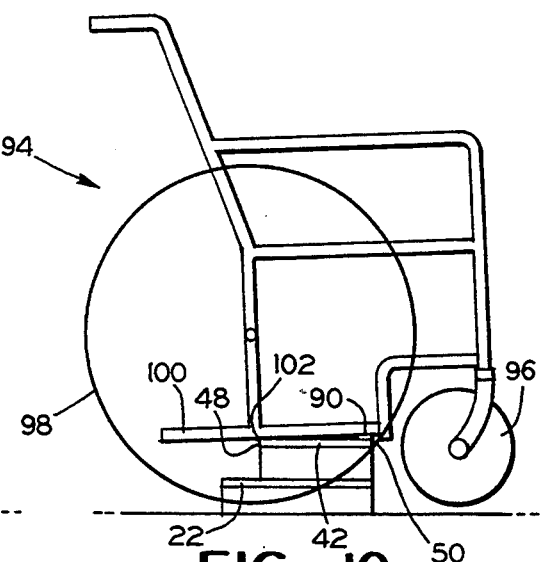
FIG. 10 is a side elevational view of the wheelchair after it is pivoted forward into the horizontal position and is resting entirely upon the adapting frame with all wheels off of the ground.
Figure 11:
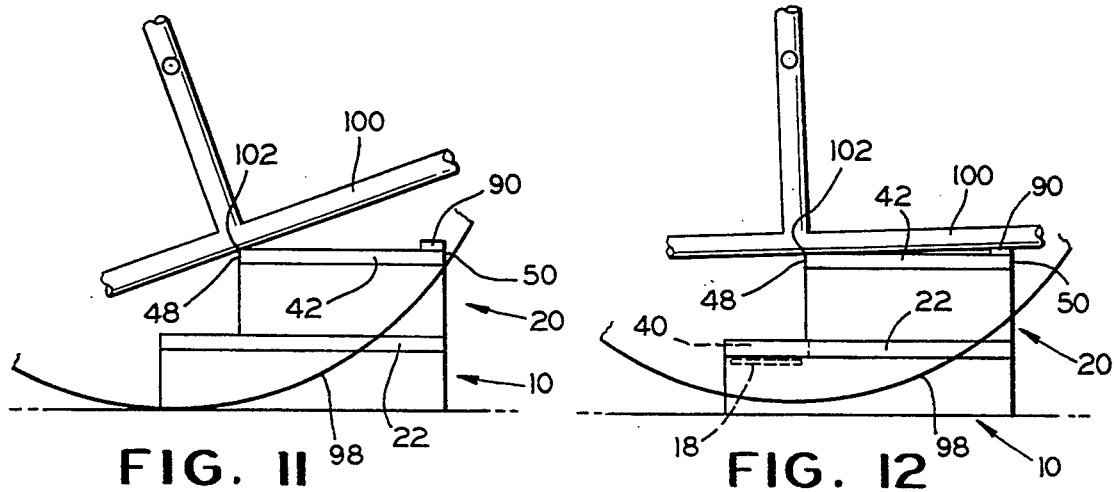
FIG. 11 is an enlarged side elevational view of the chassis engaging the pivot edge of top planar piece.
Figure 12:
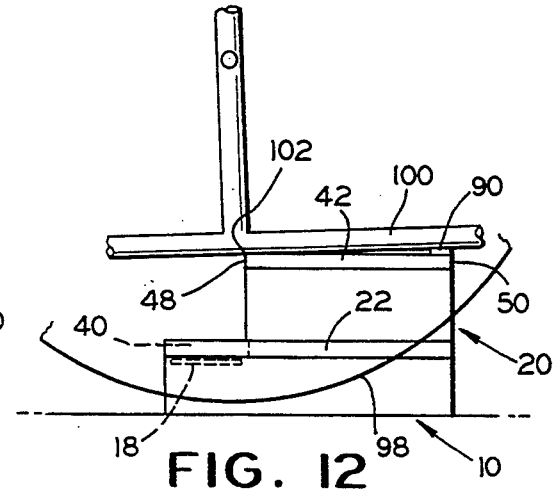
FIG. 12 is an enlarged side elevational view of the chassis resting on the adapting frame after the chassis is pivoted forward into the horizontal position.

The wheelchair 94 is positioned in front of lateral edge 28 of the base 22 as shown in FIG. 8. A person standing behind the wheelchair 94 tips the wheelchair such that the front wheels 96 are lifted off of the floor. The wheelchair 94 is pushed forward, the large rear wheels 98 having sufficient spacing for the wheels 98 to clear the lateral edge 28 of the base 22.

The wheelchair 94 includes a pair of lower chassis bars 100 in parallel, spaced-apart relationship. When the wheelchair is tipped, the chassis bars 100 are maintained at an angle such that the lateral edge 48 of the top sheet 42 contacts the chassis bars 100 at contact points 102 towards the rear half of the chassis bars 100. Once the chassis bars are in contact with the lateral edge 48, the wheelchair 94 is pivoted about the two contact points 102 until the front end of the chassis bars 100 are resting on the tilt rails 90 on lateral edge 50 of the top sheet 42.

As the wheelchair comes to rest on the top sheet 42, the large wheels 98 are lifted off the floor such that the wheelchair 94 is totally off the floor and resting on the top sheet 42 of the frame 20. As noted above, the support members 78, 80 and the top sheet 42 are sized at the proper height and width to fit between the large wheels 98, engage the chassis bars 100, lift the large wheels 98 off of the floor when the wheelchair 94 is pivoted about the contact points 102, and fully support the wheelchair 94 on the top sheet 42.

When the contact points 102 are established, the corners 72 of the adapting frame 20 prevent the frame 20 from sliding on the scale 10. When the wheelchair 94 is resting on the top sheet 42, the tilt rails 90 maintain the wheelchair 94 at a desire angle so that the individual in the wheelchair 94 does not fall forward.

The vertical segments 88 of the top brackets 84L, 84R extend above the upper surface 44 of the top sheet 42 and form a barrier to prevent the chassis bars 100 of the wheelchair 94 from sliding off of the longitudinal edges 52, 54 of the top sheet 42.

Once the wheelchair 94 is positioned on the adapting frame 20, the person standing behind the wheelchair can maintain control of the wheelchair and observe the weight registered on the indicator 18. To remove the wheelchair 94 from the adapting frame 20, the wheelchair 94 is pivoted backwards until the large wheels 98 touch the floor and the wheelchair 94 can be pulled away from the scale 10 and frame 20.

The adapting frame 20 distributes the force of the wheelchair 94 and the individual evenly over the scale 10. This creates a centrally located center of gravity about the scale which is important in obtaining an accurate reading. The narrow base 22 allows accurate measurements because the center of gravity remains over the scale 10 and is not subject to the shifting or moving of the individual being weighed.

The adapting frame 20 eliminates the need for transferring an individual out of a wheelchair 94 to obtain a weight measurement. The individuals actual weight is ascertained by knowing the weight of the empty wheelchair 94 and frame 20. The tare weight of the wheelchair 94 and frame 20 is obtained by weighing the wheelchair 94 and frame 20 at a convenient time when the wheelchair 94 is unoccupied. The tare weight is then subtracted from the combined weight measurement of the individual, the wheelchair 94, and the frame 20 in order to obtain the individuals actual weight.

The preferred embodiment is lightweight and easy to store. The adapting frame 20 covers about 1.25 square feet and is conveniently stored away until needed. The adapting frame 20 is then positioned upon a conventional floor scale 10 for use. Upon completion of the weighing process, the adapting frame 20 is then removed and restored.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An adapting frame for mounting on a bathroom scale to weigh an individual in a wheelchair having a chassis, said adapting frame comprising:

(a) a rectangular base for positioning against a platform of a bathroom scale, said base having an upper surface and a lower surface, and a viewing notch formed in a lateral edge of said base;

(b) bracket means attached to and extending perpendicular to the lower surface of said base for securing the base about an outer edge of the bathroom scale;

(c) a support member mounted on and extending perpendicular to the upper surface of said base; and (d) a rectangular top sheet mounted on said support member, said top sheet having a lateral edge for pivotably engaging the chassis of the wheelchair, whereby the chassis of the wheelchair may be tilted backward by a single attendant and pivoted about the lateral edge of said top sheet to position the wheelchair on the top sheet such that the weight of the wheelchair and individual are transferred to the scale platform for weighing purposes.

2. The adapting frame as recited in claim 1, wherein the bracket means for securing the base to the scale includes a pair of adjustable bottom brackets in parallel spaced- apart relationship mounted along longitudinal edges of said rectangular base.

3. The adapting frame as recited in claim 2, wherein each bottom bracket includes a corner piece integrally formed at one end to engage a corresponding corner of the scale.

4. The adapting frame as recited in claim 2, wherein each bottom bracket for engaging the scale is a right angle bracket having a planar segment secured to said base and a planar segment extending perpendicular to said base.

5. The adapting frame as recited in claim 1, including a tilt rail mounted on an upper surface of said top sheet along an opposing lateral edge.

6. The adapting frame as recited in claim 1, wherein said support member further comprises at least two vertical walls in spaced-apart relationship extending laterally and perpendicularly from said base.

7. The adapting frame as recited in claim 1, including top brackets mounted along opposite longitudinal edges of said top sheet to form side rails extending above said top sheet.

8. The adapting frame as recited in claim 7, wherein the top brackets are right angle brackets having a planar segment secured to said top sheet and a planar segment extending perpendicular to said top sheet.

9. An adapting frame for mounting on a bathroom scale to weigh an individual in a wheelchair having a chassis, said adapting frame comprising:

(a) a rectangular base for positioning against a platform of a bathroom scale, said base having an upper surface and a lower surface, longitudinal edges, and a viewing notch formed in a lateral edge of said base;

(b) adjustable bottom brackets mounted along the longitudinal edges of said base for securing said base about an outer edge of the bathroom scale, said bottom brackets being right angle brackets having a planar segment secured to said base and a planar segment extending perpendicular to said base;

(c) at least two vertical walls in spaced-apart relationship mounted on and extending laterally and perpendicularly to the upper surface of said base;

(d) a rectangular top sheet mounted on said vertical walls, said top sheet having longitudinal edges and a lateral edge, said lateral edge for pivotably engaging the chassis of the wheelchair, whereby the chassis of the wheelchair may be tilted backward by a single attendant and pivoted about the lateral edge of said top sheet to position the wheelchair on the top sheet such that the weight of the wheelchair and individual are transferred to the scale platform for weighing purposes; and (e) top brackets mounted to said top sheet, said top brackets being right angle brackets having a planar segment secured to the longitudinal edges of said top sheet and a planar segment extending perpendicular to said top sheet, said top brackets extend above said top sheet and form side rails to prevent the wheelchair from sliding off the longitudinal edges of said top sheet.

10. The adapting frame as recited in claim 9, including a tilt rail mounted on an upper surface of said top sheet along an opposing lateral edge.

* * * * *